United States Patent
Weng

(10) Patent No.: US 8,926,111 B2
(45) Date of Patent: Jan. 6, 2015

(54) KEYBOARD LIGHTING DEVICE

(75) Inventor: Chung-Kuo Weng, Xizhi (TW)

(73) Assignee: Flextronics AP, LLC, Broomfield, CO (US)

( * ) Notice: Subject to any disclaimer, the term of this patent is extended or adjusted under 35 U.S.C. 154(b) by 248 days.

(21) Appl. No.: 12/971,599

(22) Filed: Dec. 17, 2010

(65) Prior Publication Data

US 2012/0155062 A1   Jun. 21, 2012

(51) Int. Cl.
*F21V 33/00* (2006.01)
*G06F 1/16* (2006.01)
*F21Y 101/02* (2006.01)

(52) U.S. Cl.
CPC .......... *F21V 33/0052* (2013.01); *G06F 1/1616* (2013.01); *F21Y 2101/02* (2013.01)
USPC ............. 362/85; 362/109; 362/253; 362/269; 362/421; 362/427; 362/418; 362/197

(58) Field of Classification Search
CPC .... G06F 1/1616; F21V 33/0052; F21V 21/30
USPC ............. 362/197, 23, 269, 427, 109, 85, 253, 362/421, 418
See application file for complete search history.

(56) References Cited

U.S. PATENT DOCUMENTS

| | | | |
|---|---|---|---|
| 3,583,734 A | 6/1971 | Magi | |
| 4,359,487 A | 11/1982 | Schneider | |
| 5,903,894 A | 5/1999 | Reneris | |
| 6,690,585 B2 | 2/2004 | Betts-La Croix | |
| 6,928,464 B2 | 8/2005 | Appiah et al. | |
| 6,991,350 B2 * | 1/2006 | McInnis | 362/362 |
| 7,054,963 B2 | 5/2006 | Betts-La Croix | |
| 7,054,965 B2 | 5/2006 | Bell et al. | |
| D524,809 S | 7/2006 | Alcouloumre et al. | |
| 7,247,032 B2 | 7/2007 | Merz | |
| 7,249,873 B2 * | 7/2007 | Tiesler et al. | 362/488 |
| 7,274,355 B2 | 9/2007 | Betts-La Croix et al. | |
| 7,285,021 B2 | 10/2007 | Bell et al. | |
| 7,352,332 B1 | 4/2008 | Betts-La Croix et al. | |
| 7,353,053 B2 | 4/2008 | Prichard et al. | |

(Continued)

FOREIGN PATENT DOCUMENTS

WO    WO 2009116996 A1 *  9/2009
WO        2010021626 A1     2/2010

OTHER PUBLICATIONS

International Search Report dated May 1, 2012, International Application No. PCT/US11/64991, International filed: Dec. 14, 2011, authorized officer Lee W. Young, 11 pages.

*Primary Examiner* — Jong-Suk (James) Lee
*Assistant Examiner* — Tsion Tumebo
(74) *Attorney, Agent, or Firm* — Haverstock & Owens LLP

(57) ABSTRACT

A portable computer includes a user interface portion and a screen portion that has a substantially planar surface rotatably coupled to the user interface portion. At least one light fixture is positionably mounted to the screen portion in a stowage position or in a functional position. In some embodiments, the light fixture includes a spring member. In the stowage position, the spring member is compressed, and the light fixture is flush with the substantial planar surface. In the functional position, the spring member is relaxed, and the light fixture illuminates the user interface portion. In some embodiments, the light fixture includes a swivel member that enables 360° rotation of the light fixture.

14 Claims, 8 Drawing Sheets

(56) References Cited

U.S. PATENT DOCUMENTS

| | | |
|---|---|---|
| 7,357,648 B2 | 4/2008 | Merz |
| 7,372,454 B2 | 5/2008 | Betts-La Croix |
| 7,390,197 B2 | 6/2008 | Merz |
| D579,451 S | 10/2008 | Ward et al. |
| D581,935 S | 12/2008 | Merz |
| 7,462,073 B2 | 12/2008 | Bell et al. |
| 7,493,500 B2 | 2/2009 | Chin et al. |
| 7,518,860 B2 | 4/2009 | Chin et al. |
| 7,537,485 B2 | 5/2009 | Bell et al. |
| 7,572,021 B2 * | 8/2009 | Sawada et al. .................. 362/18 |
| D602,938 S | 10/2009 | Ward et al. |
| 7,765,326 B2 | 7/2010 | Robbin et al. |
| 7,794,113 B2 * | 9/2010 | Lee ............................... 362/274 |
| 7,810,222 B2 | 10/2010 | Ward et al. |
| 8,021,022 B2 * | 9/2011 | Ling et al. ..................... 362/274 |
| D652,832 S | 1/2012 | Wu et al. |
| 8,111,040 B2 | 2/2012 | Guthrie et al. |
| 8,223,487 B2 * | 7/2012 | Chen et al. ............... 361/679.57 |
| 8,353,048 B1 | 1/2013 | Werner et al. |
| 8,567,995 B2 * | 10/2013 | Sauer et al. ................... 362/287 |
| 2001/0043188 A1 * | 11/2001 | Nakamura .................... 345/102 |
| 2003/0202339 A1 | 10/2003 | Oross et al. |
| 2005/0122671 A1 | 6/2005 | Homer |
| 2005/0289266 A1 | 12/2005 | Illowsky et al. |
| 2006/0188096 A1 | 8/2006 | Aguilar |
| 2006/0224620 A1 | 10/2006 | Silverman et al. |
| 2007/0024588 A1 | 2/2007 | Yin et al. |
| 2007/0124372 A1 | 5/2007 | Liu et al. |
| 2007/0146307 A1 | 6/2007 | Kuo et al. |
| 2008/0112113 A1 | 5/2008 | Sawadski et al. |
| 2008/0180391 A1 | 7/2008 | Auciello |
| 2008/0266865 A1 * | 10/2008 | Lev et al. ...................... 362/287 |
| 2009/0109649 A1 | 4/2009 | Harris et al. |
| 2009/0166493 A1 * | 7/2009 | Lee ........................ 248/226.11 |
| 2009/0268401 A1 * | 10/2009 | Krah ........................ 361/679.55 |
| 2010/0042671 A1 | 2/2010 | Natt et al. |
| 2010/0064536 A1 | 3/2010 | Caskey et al. |

* cited by examiner

KEYBOARD LIGHTING DEVICE

FIELD OF THE INVENTION

The present invention relates to portable computers. More particularly, the present invention relates to a multi positionable portable computer having lighting fixtures for illuminating a user interface.

BACKGROUND

The portable computer, also referred to as a laptop computer, has become ubiquitous due to its convenience and portability. In general, portable computers offer a high degree of processing capability for creating documents, spreadsheets, and the like. Although the design of the standard "clamshell" portable computer, along with some variations, is generally useful only for working on one's lap or on a desk. FIG. 1A shows a standard "clamshell" portable computer 100. The clamshell portable computer 100 comprises an viewing portion 110 having a screen 115. The viewing portion 110 is rotatably coupled to a processing, or base unit 120. In general, the base unit 120 comprises a keyboard 125 and a trackpad 127. The viewing portion 110 and the base unit 120 are rotatably coupled by a hinge 130, so that the computer 100 can be opened in a functional position or closed in a stowage position. In some instances, a laptop computer is used in low levels of light. For example, the cabin lights of an airplane are generally dimmed or turned off during overnight flights. Some laptop computers are equipped with a backlighting for the keyboard 125 for providing illumination 128 of the keys for use in the dark. Although convenient, such backlighting adds thickness to the base unit 120 and requires several lighting sources, such as LEDs, for lighting individual keys, thereby depleting the battery more quickly and adding significant cost. Also, keyboard backlighting cannot illuminate any document or other material that the user of the laptop requires.

If a particular laptop is not equipped with a backlit keyboard, the user of a laptop must use an external lighting source to view the keyboard. FIG. 1B shows a common external lighting device 150. The external lighting device 150 is connected to a laptop computer through a USB jack 155 to a USB port (not shown) of a laptop computer. The lighting device 150 also draws power from the USB port. The external lighting device 150 has a light fixture 160 generally comprising one or more LEDs 165. In some available models, the external lighting device 150 is flexibly connected to the USB jack 155 so that the lighting fixture 160 can be position to direct light in any direction. Although useful to direct light toward a keyboard in the dark, the external lighting device is a discrete, external component that must be accounted for, separately stowed, and separately purchased. Furthermore, such devices either use up a USB port or require battery operation. Because of their general small size, they are easy to lose. Also, it can be inconvenient locating such a device in the dark when it is needed most.

SUMMARY OF THE INVENTION

What is provided is a portable computer having a positionable lighting fixture for providing light when ambient light is low, unavailable or inconvenient. The lighting fixture can be positioned to illuminate the keyboard, other documents around the laptop, or the like. The lighting fixture can be fixed in a stowage position when the laptop is closed or not in use. Advantageously, the lighting fixture is a low cost integrated solution to backlit keyboards and external devices. Only one light source per fixture is needed rather than light sources for individual keys. Also, because the lighting fixture is integrated into the laptop, a user can quickly and conveniently illuminate the keyboard without searching for an external device when ambient light is low or not available.

In one aspect of the invention, a portable computer comprises a user interface portion and a screen portion rotatably coupled to the user interface portion. Preferably, the screen portion comprises at least one light fixture positionably mounted to the screen portion. In some embodiments, the light fixture comprises an LED. The light fixture is positionably mounted in one of a stowage position and a functional position. In a stowage position, the light fixture is flush with the substantially planar surface of the screen portion so that the laptop can be folded. In a functional position, the light fixture illuminates the user interface portion.

In some embodiments, light fixture comprises a spring member. The spring member can be made of any convenient material resilient to flex, such as plastic or metal. In a stowage position, the spring member is compressed against a housing or case of the screen portion and held in place by a latch member. The latch member is actuated by a user, which releases the tension on the compressed spring member, thereby relaxing the spring member into a steady state. When the spring member is relaxed, the light fixture is forced in a functional position.

Alternatively, the light fixture comprises a swivel member that enables 360 degree rotation of the light fixture. In embodiments wherein the light fixture has a swivel member, the swivel member further comprises a concave housing for receiving a lens. The lens is generally round and convex in shape for diffusing the light from the LED to illuminate the entire keyboard. To keep the lens and LED in place, the swivel member comprises a bracket, wherein the bracket has an opening having a diameter less than a diameter of the lens for retaining swivel member and effectuating a swivel motion. Advantageously, the swivel member enables the light fixture to be pointed at the keyboard or slightly away in order to illuminate documents or the like adjacent to the laptop. In some embodiments, a laptop comprises a plurality of lighting fixtures, with some having a swivel member for full rotation and some having a spring member.

Other features and advantages of the present invention will become apparent after reviewing the detailed description of the embodiments set forth below.

BRIEF DESCRIPTION OF THE DRAWINGS

The accompanying drawings, which are incorporated in and form a part of this specification, illustrate embodiments of the invention and, together with the description, serve to explain the principles of the invention, but not limit the invention to the disclosed examples.

The present invention is described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Reference will now be made in detail to the embodiments of a keyboard lighting apparatus, examples of which are illustrated in the accompanying drawings. While the invention will be described in conjunction with the embodiments below, it will be understood that they are not intended to limit the invention to these embodiments and examples. On the contrary, the invention is intended to cover alternatives, modifications and equivalents, which may be included within the spirit and scope of the invention as defined by the appended claims. Furthermore, in the following detailed description of the present invention, numerous specific details are set forth in order to more fully illustrate the present invention. However, it will be apparent to one of ordinary skill in the prior art having the benefit of this disclosure that the present invention may be practiced without these specific details. In other instances, well-known methods and procedures, components and processes haven't not been described in detail so as not to unnecessarily obscure aspects of the present invention. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
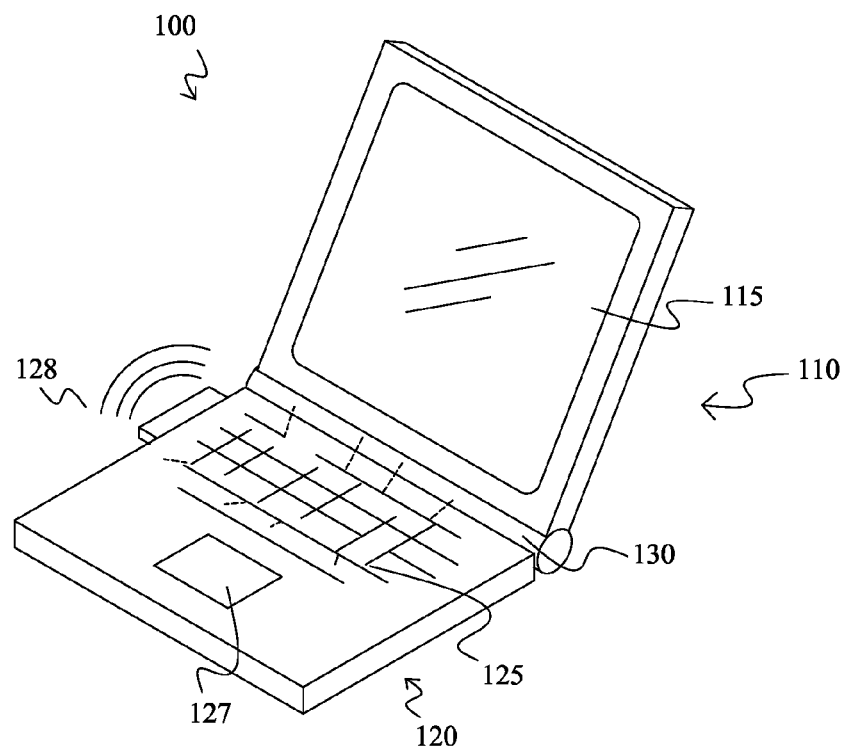
FIG. 1A shows a prior art portable computer.
Figure 1B:
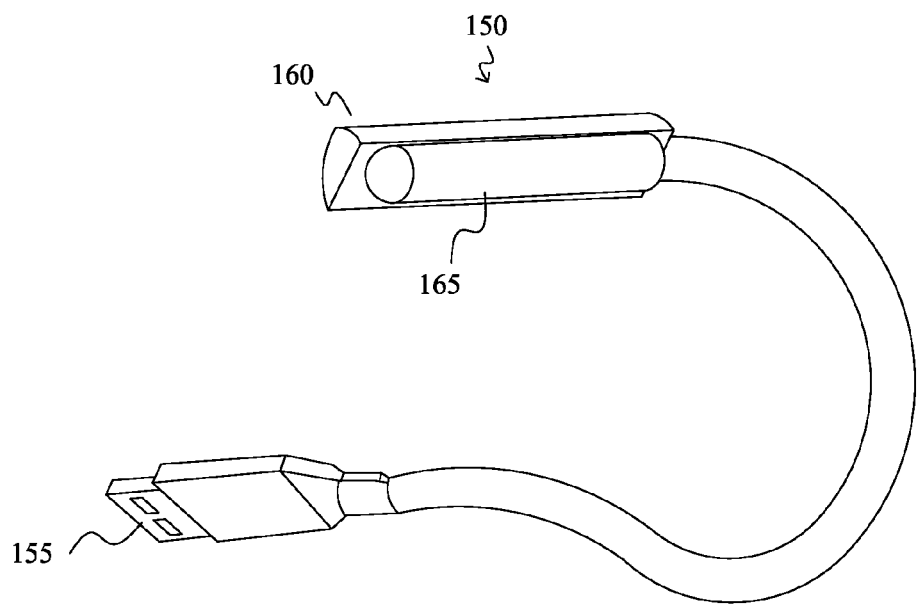
FIG. 1B shows a prior art external lighting device.
Figure 2A:
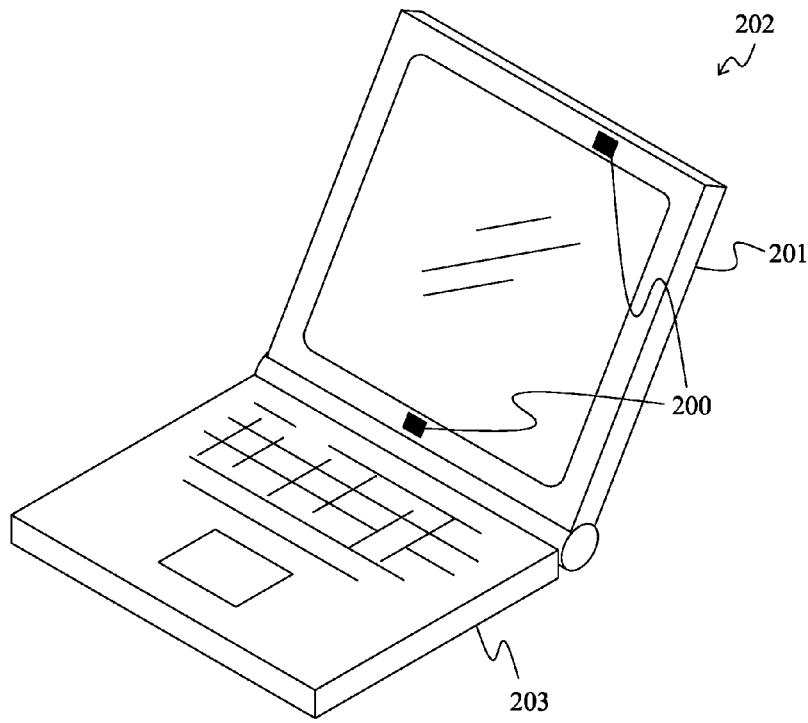
FIG. 2A shows a portable computer having light fixtures in a stowage position per an embodiment of this invention.
Figure 2B:
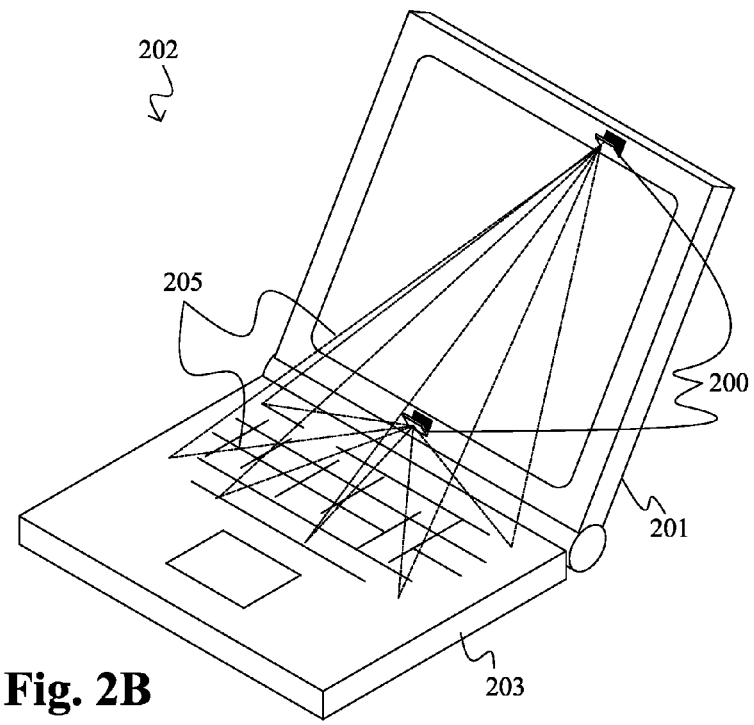
FIG. 2B shows a portable computer having light fixtures in a functional position per an embodiment of this invention.

FIGS. 2A and 2B show a laptop computer 202 having lighting fixtures 200 in stowage, or closed positions and open, or functional positions respectively. FIG. 2A shows a laptop computer 202 that is open. In this exemplary embodiment, the laptop computer 202 comprises two lighting fixtures 200 that are in a stowage position. Preferably, in a stowage position, the lighting fixtures 200 are flush with the surface of the screen portion 201, so that the lighting fixtures 200 do not impede closing of the laptop computer 202. FIG. 2B shows the lighting fixtures 200 in an open, or functional position. The lighting fixtures 200 are angled toward the user interface portion 203 with respect to the screen portion 201 such that the lighting fixtures 200 illuminate the user interface portion with light 205.

Figure 2C:
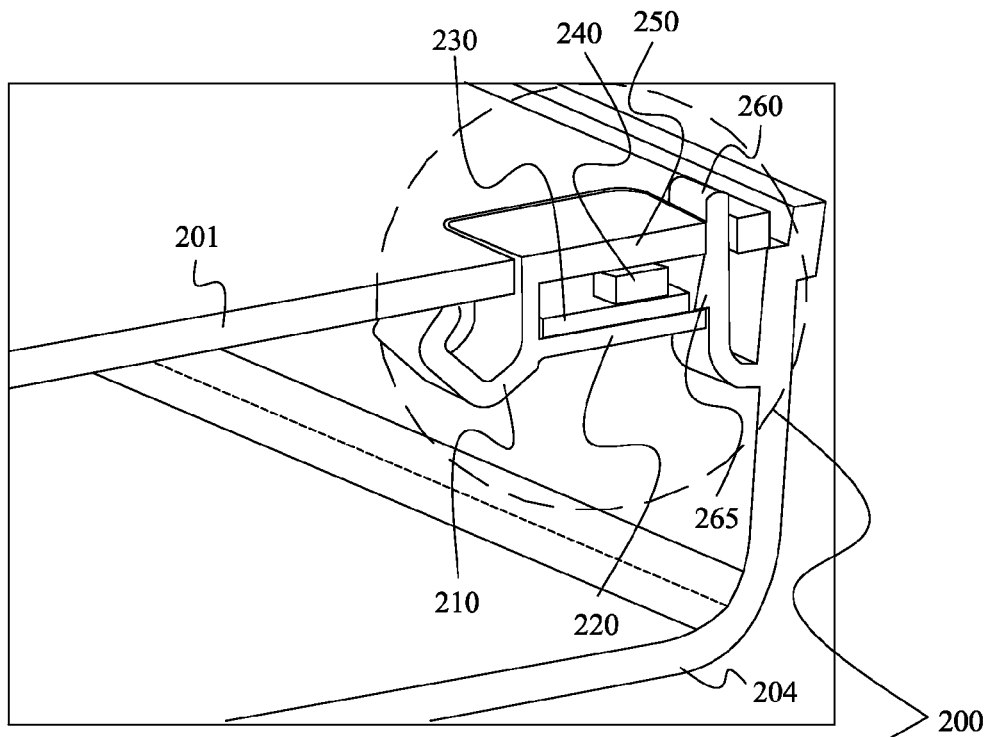
FIGS. 2C and 2D are a detailed view of a lighting fixture per an embodiment of this invention.
Figure 2D:
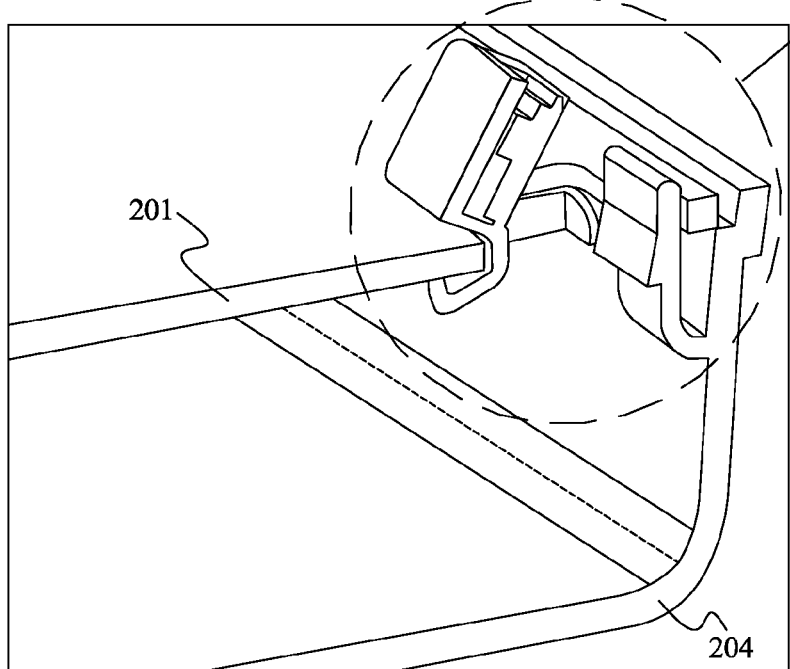

FIGS. 2C and 2D show the lighting fixture 200 positionably mounted to the screen portion 201 of a laptop in a stowage position and a functional position respectively. The lighting fixture comprises an LED 240 for providing light, circuitry 230 for driving the LED 240, and a lens 250 for diffusing the light provided by the LED. In the embodiment shown, the lighting fixture 200 is spring coupled and spring actuated. To that end, a spring member 210 is affixed to a housing 220. The spring member 210 is preferably a flexible and resilient metal, such as plastic, metal, or any other suitable or convenient material. FIG. 2A shows the lighting fixture 200 in a stowage position. In a stowage position, the lighting fixture 200 is preferably substantially planar with respect to the screen portion 201. Advantageously, when the laptop is closed such that the screen portion 201 contacts the user interface portion (not shown), the lighting fixture 200 is recessed into the screen portion 201 and does not impede folding of the laptop computer. In the stowage position, the spring member 210 is compressed. Stated differently, the spring member is forced out of a steady state shape and therefore has stored energy. To counter the stored energy within the spring member 210 and to affix the lighting fixture 200 in a stowage position, a latch member 260 is provided. The latch member 260 comprises a latching protrusion 265 that acts as a stop against the spring force of the spring member 210 when the latching protrusion 265 comes to rest against the housing 220. FIG. 2D shows the lighting fixture 200 in an open, or functional position. To place the lighting fixture 200 in the functional position, the latching member 260 can be actuated by a user by pressing against the tip of the latching member 260 thereby releasing the housing 220 from the stop against the latching protrusion 265. The energy held in the spring member 210 will be released causing the lighting fixture 200 to move into the functional position. The spring member 210, in its relaxed or steady state shown in FIG. 2D, conforms around the case 204 of the screen portion 201 to hold the lighting fixture 200 in place in the functional position. In the functional position, the lens 250 is angled toward the user interface portion (not shown). In the example provided, the lens 250 is angled at 60 degrees with respect to a plane defined by the surface of the screen portion 201.

Figure 3:
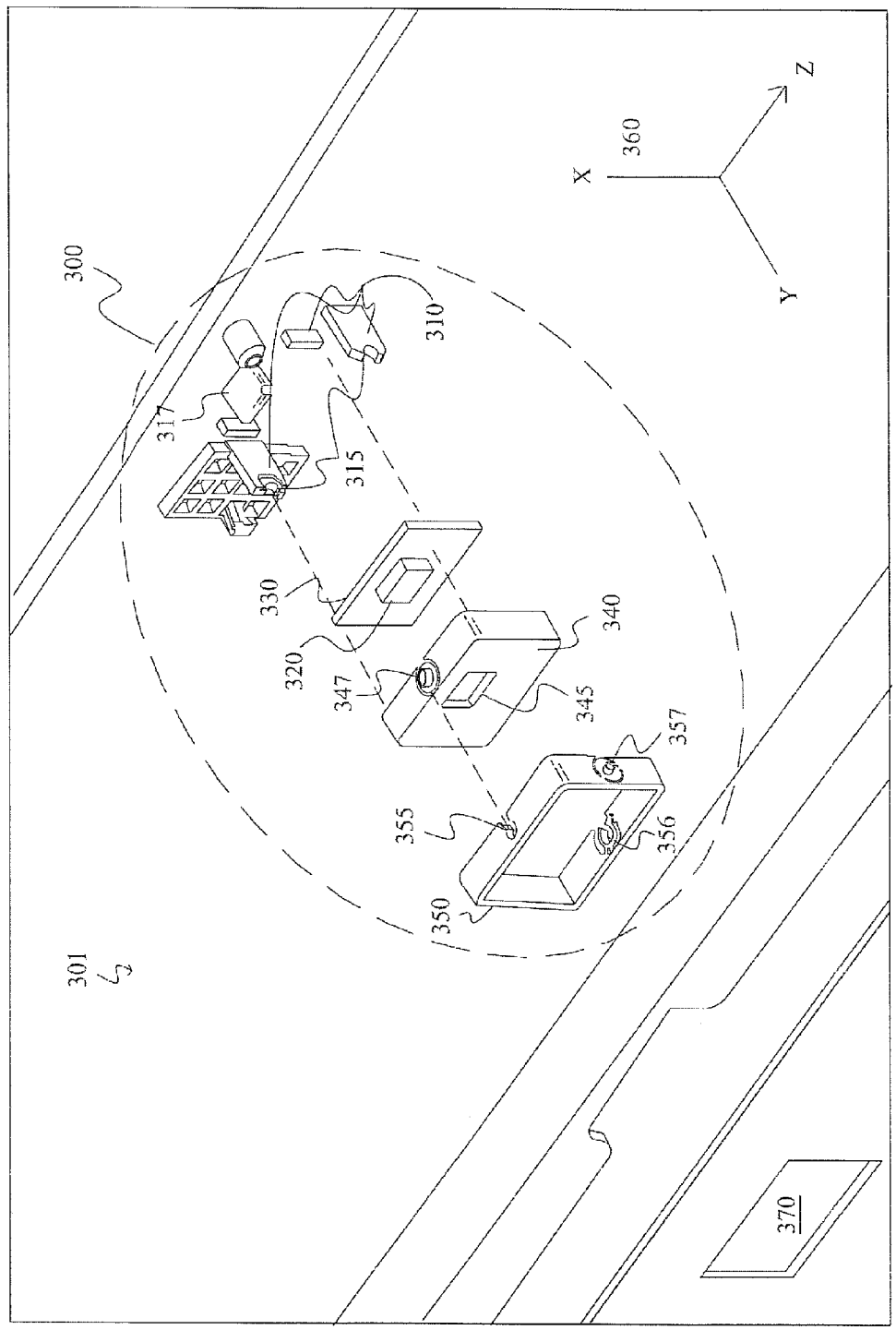
FIG. 3 is an exploded view of a lighting fixture per an embodiment of this invention.

FIG. 3 shows an alternate embodiment of a lighting fixture 300 in an exploded view. In the embodiment of FIG. 3, the lighting fixture 300 is based upon hinge assembly 310 that are affixed to a rigid member, such as the interior surface of the screen portion 301. An LED 320 is affixed to a circuitboard 330. The circuitboard 330 is coupled electrically to a battery (not shown) for providing power and a switch (not shown) for control. The LED 320 and circuitboard 330 are mounted within a fitting 340 sized to receive the circuitboard 330. The fitting comprises an opening 345 corresponding to the location of the LED 320 on the circuitboard 330 to allow light to permeate therethrough. The fitting 340 is held in position by a bracket 350. The bracket 350 comprises a notch 355 for receiving a locking protrusion 347 on the fitting 340. Preferably, the notch 355 comprises a keep 356 for locking the locking protrusion 347 in place once sufficient force has been applied in an assembly process for forcing the locking protrusion 347 past the keep 356 and into the notch 355. Although one notch 355 is detailed, any number of notches can be used to secure the fitting 340 into the bracket 350. The bracket 350 further comprises a pair of hinge protrusions 357 on either side of the bracket 350 for mating with a pair of notches 315 on the hinge assembly 310. The configuration of the hinge protrusions 357 on their respective sides mated with the notches 315 effectuates a rotational motion of the lighting fixture 300 according to the axis of rotation 360. The axis of rotation 360 is substantially in the middle of the bracket and therefore in a complete assembly. As a result, a user is able to actuate the lighting fixture 300 to set to a desired angle to emit light to a desired area of the laptop (such as the keyboard) through an opening 370 in the exterior of the screen portion 301 by pushing on a lower portion of the lighting fixture 300 and causing a rotation in the lighting fixture 300. Advantageously, the lighting fixture 300 can be positioned so that it is flush with the surface of the screen portion 301 so that it does not encumber folding and stowing the laptop. In some embodiments, a stop 317 is included for restricting unwanted motion in an upward direction that may direct light into a users eyes.

Figure 4:
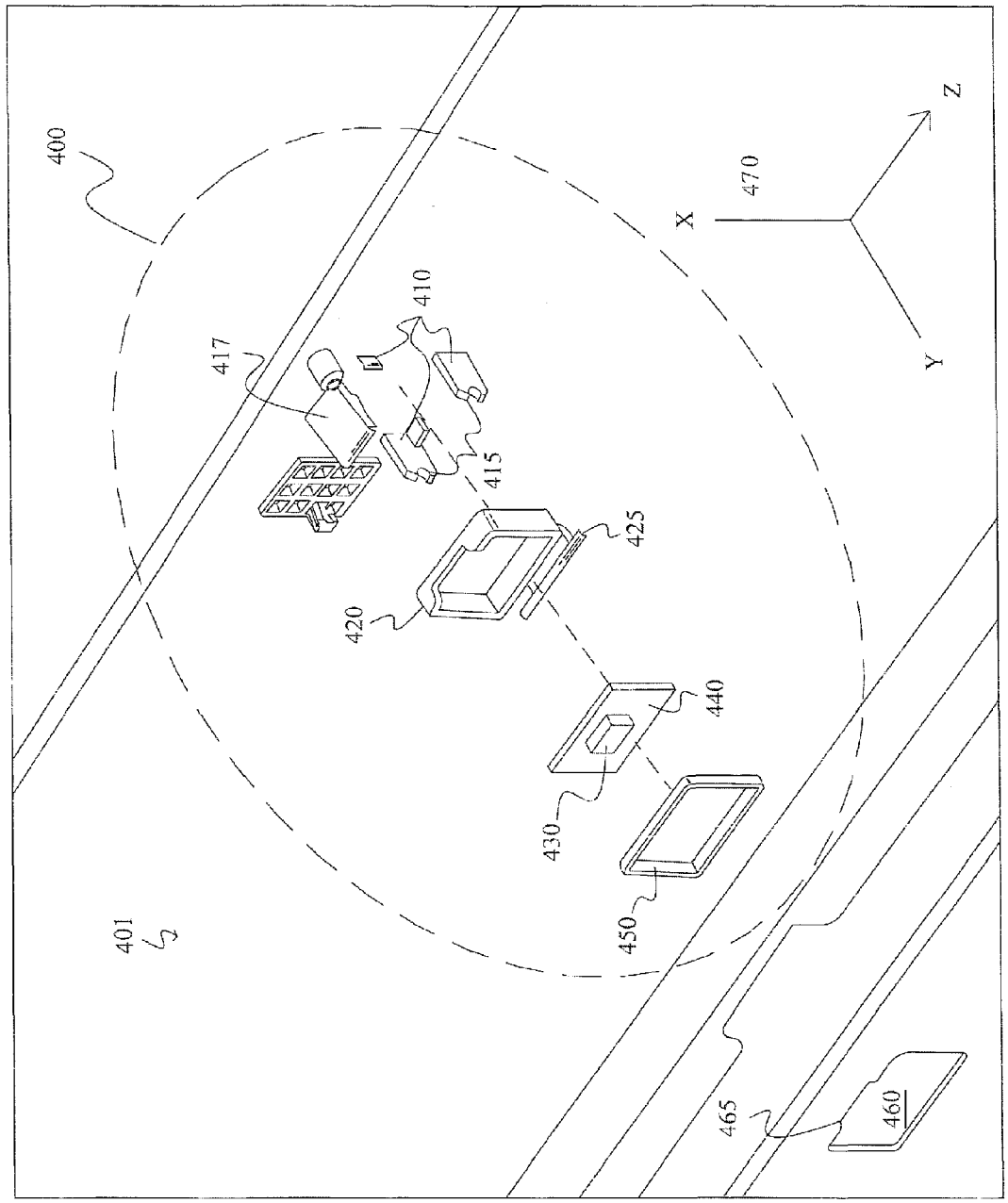
FIG. 4 is an exploded view of a lighting fixture per an embodiment of this invention.

FIG. 4 shows an alternate embodiment of a hinge assembly 410 for effectuating a rotational motion in a lighting fixture 400. The hinge assembly 410 is affixed to a rigid member, such as the interior surface of the screen portion 401. A housing 420 is sized to receive a circuitboard 440 having an LED 430. The housing 420 comprises a bar 425 for mating with notches 415 on the hinge assembly 410 to effectuate a rotational motion according to the axis 470. A lens 450 is mounted onto the housing 420 for diffusing light emitted by the LED 430 through an opening 460 in the screen portion 401. The opening 460 comprises a groove 465 so that a user may insert a portion of their finger for actuating a rotational motion and placing the lighting fixture 400 in a functional position such that the LED emits light onto the user interface portion (not shown) or a stowage position such that the lens 450 is flush with the surface of the screen portion 401. Optionally, a stop 417 restricts unwanted rotation in the X direction according to the axis 470. In this embodiment, the user actuates the lighting fixture 400 and causes rotation in the hinge by pushing downward on a top surface of the housing 420 and causing it to rotate forward along the axis 470.

Figure 5A:
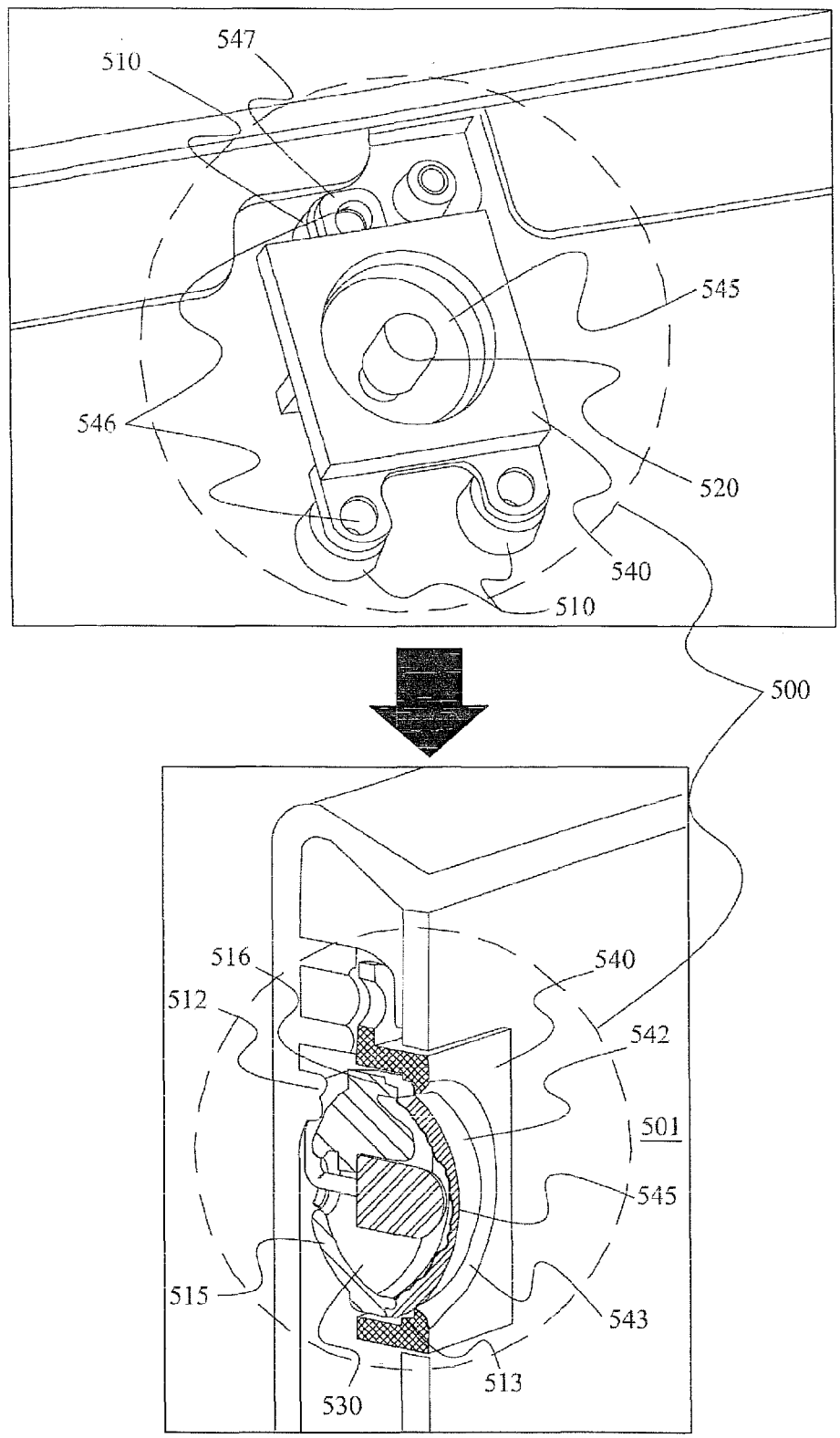
FIG. 5A is detailed view of a lighting fixture per an embodiment of this invention.
Figure 5B:
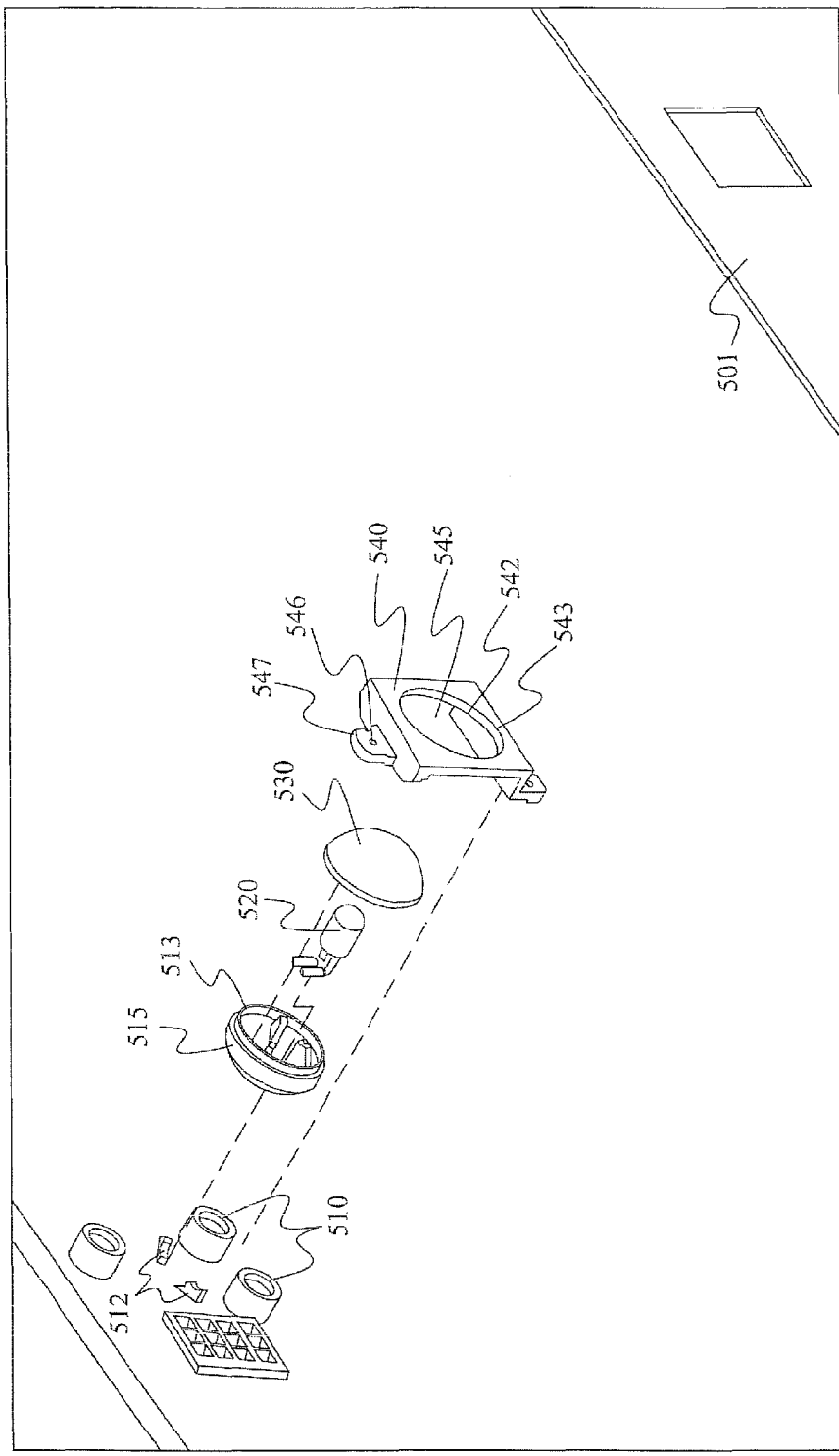
FIG. 5B is an exploded view of a lighting fixture per an embodiment of this invention.
Figure 5C:
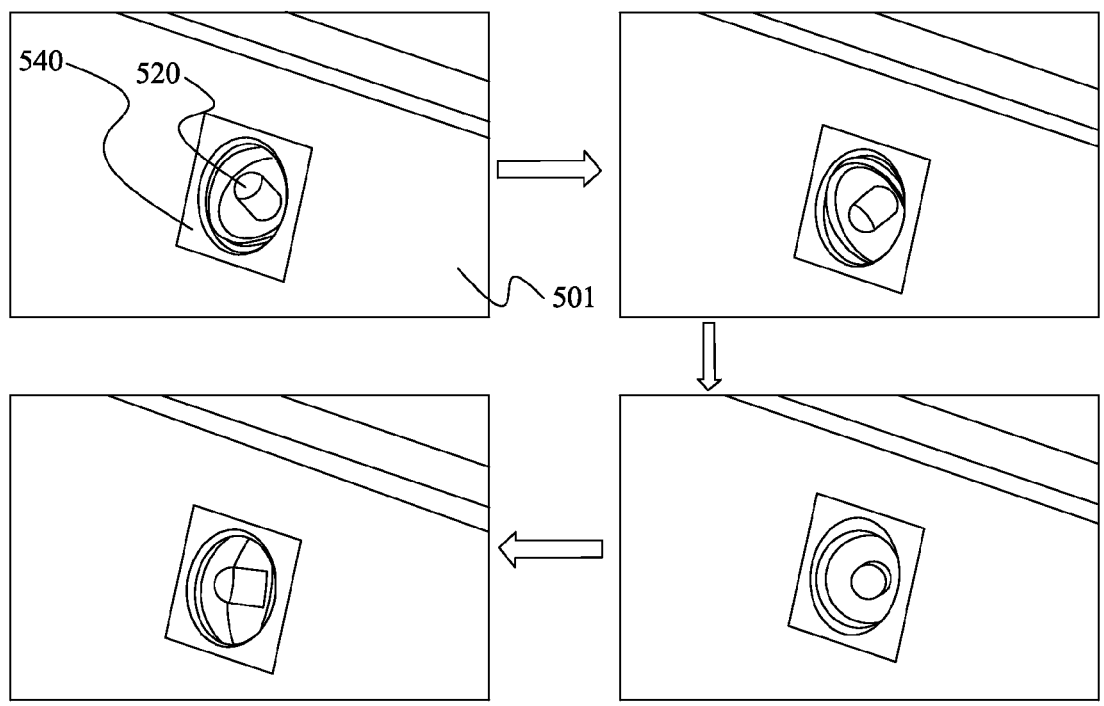
FIG. 5C is operational view of a lighting fixture per an embodiment of this invention.

FIGS. 5A, 5B, and 5C show an alternate embodiment of a portable computer lighting fixture 500 in cross section, exploded, and operational views respectively. Referring to FIGS. 5A and 5B, an LED 520 is affixed in a swivel housing 515. Preferably, the swivel housing 515 has a round, convex external shape for effectuating a swivel motion against a swivel mount 512. The swivel housing 515 further comprises an interlocking feature 513 for receiving a lens 530. The lens 530 diffuses light provided by the LED 520. The lens 530 also has a round, convex external shape. To effectuate coupling, the diameter of the swivel housing 515 and the lens 530 should be the same. When coupled via the interlocking feature 513, the swivel housing 515 and lens 530 have generally an ovoid cross section to enable a swiveling motion in any direction. A swivel bracket 540 is provided for holding the swivel housing 515 and lens in a position. In some embodiments, the swivel bracket 540 comprises an opening 545 having an inner diameter 542 and an outer diameter 543. Preferably, the inner diameter 542 is less than the diameter of the swivel housing 515 and lens 530, so that the swivel housing 515 and lens 530 are maintained in a position without falling through the opening 545. A user can actuate the swivel housing through the opening 545 and orient the lens 530 in a desired direction. As can be appreciated, the swivel housing 515 is not restricted with respect to orientation. In some embodiments, the swivel housing 515 comprises a stop 516. The stop 516 comes into contact with the swivel mount 512 for stopping undesired motion of the swivel housing 515. In the example provided, only one swivel mount 512 is shown. However, any number of stops 516 and swivel mounts 512 can be included for restricting the swivel motion of the swivel housing 515. Preferably, the mounting bracket 540 comprises a plurality of mounting members 547 for mounting onto bosses 510. The bosses 510 are preferably affixed to the interior of the casing of the screen portion 501. In the example given, screw holes 546 are provided however any method or means of affixing the mounting bracket 540 to the bosses 510 can be utilized. FIG. 5C shows the portable computer lighting fixture 500 oriented in several directions. Due to its generally ovoid cross section, the swivel housing 515/lens 530 combination swivels freely between the swivel mount 512 of FIGS. 5A and 5B and the opening 545 of the swivel bracket 540. The swivel housing 515/lens 530 combination should be of a size to fit tight enough between the swivel bracket 540 and the swivel mount 512 such that the swivel housing 515/lens 530 combination can remain in a position once an orientation has been selected. However, the fit should not be so tight that a user cannot easily orient the swivel housing 515/lens 530 combination in another direction.

The present invention has been described in terms of specific embodiments incorporating details to facilitate the understanding of the principles of construction and operation of the invention. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A portable computer comprising:
   a. a user interface portion;
   b. a screen portion having a substantially planar surface rotatably coupled to the user interface portion, wherein the screen portion comprises at least one light fixture positionably mounted to the screen portion, wherein the at least one light fixture includes:
      i. a housing;
      ii. a spring member affixed to the housing, wherein the spring member includes a U-bend region, wherein an interior surface portion of the U-bend region receives a section of the screen portion to hold the at least one light fixture in a functional position;
      iii. a latch member configured to be actuated by a user by depressing a portion of the latching member; and
      iv. a latching protrusion configured as a stop against the spring member when the latching protrusion comes to rest against the housing.

2. The portable computer of claim 1, wherein the at least one light fixture comprises an LED.

3. The portable computer of claim 1, wherein the at least one light fixture is positionably mounted in one of a stowage position and the functional position.

4. The portable computer of claim 1, wherein when in a stowage position, the at least one light fixture is flush with the substantially planar surface, and when in the functional position, the at least one light fixture illuminates the user interface portion.

5. The portable computer of claim 1, wherein the at least one light fixture comprises a lens positioned laterally to a face of the housing.

6. The portable computer of claim 5, wherein the lens is for diffusing light provided by a light emitting source.

7. The portable computer of claim 1, wherein the spring member is relaxed in the functional position and is compressed in a stowage position.

8. The portable computer of claim 1, wherein the latch member is for fixing the at least one light fixture in a stowage position.

9. The portable computer of claim 1, wherein the at least one light fixture is configured to angle at 60° with respect to the planar surface of the screen portion.

10. The portable computer of claim 1, wherein the contact area of the latch member and the housing is distal to the spring member.

11. The portable computer of claim 1, wherein the at least one light fixture includes a first light fixture and a second light fixture.

12. A portable computer comprising:
   a. a user interface portion comprising a keyboard and a pointer device;
   b. a screen portion hingedly coupled to the user interface portion; and
   c. a lighting fixture positionably coupled to the screen portion, the lighting fixture having:
      i. a housing to house an LED for providing light when a top portion of the housing opens away from the screen portion;
      ii. a spring member coupled at a bottom portion of the housing, the spring member for affixing the position of the lighting fixture in one of a stowage position and a functional position, wherein the spring member is compressed in a stowage position and relaxed in a functional position, wherein the LED is directed toward the user interface portion in a functional position, wherein the spring member includes a U-bend region, wherein an interior surface portion of the U-bend region receives a section of the screen portion to hold the lighting fixture in the functional position; and
      iii. a latch member for holding the position of the lighting fixture in a stowage position by providing a counter force to the compressed spring member.

13. A portable computer comprising:
   a. a user interface portion comprising a keyboard and a pointer device;
   b. a screen portion hingedly coupled to the user interface portion; and
   c. a lighting fixture positionably coupled to the screen portion, the lighting fixture having:
      i. an LED for providing light;
      ii. a concave housing including:
         (1) an interlocking portion around a circumferential edge of the concave housing; and
         (2) at least one stop;
      iii. a swivel mounted lens for diffusing the light provided by the LED, wherein the interlocking portion is for receiving the swivel mounted lens; and
      iv. a bracket having an opening, the opening having a diameter less than a diameter of the lens for retaining the lens in position and effectuating a swivel motion of the swivel mounted lens through the opening, wherein the bracket comes in contact with the at least one stop to stop unwanted motion of the concave housing.

14. The portable computer of claim 13, wherein the concave housing enables 360 degree rotation of the light fixture.

\* \* \* \* \*